US008109438B2

(12) United States Patent
Walker et al.

(10) Patent No.: US 8,109,438 B2
(45) Date of Patent: *Feb. 7, 2012

(54) GAME PRESENTATION IN A RETAIL ESTABLISHMENT

(75) Inventors: Jay S. Walker, Ridgefield, CT (US); Norman C. Gilman, North Haledon, NJ (US); Magdalena M. Fincham, Ridgefield, CT (US); Geoffrey M. Gelman, Brooklyn, NY (US); Keith Bemer, Pittsburgh, PA (US); Andrew P. Golden, Jamaica Plain, MA (US); Dean P. Alderucci, Westport, CT (US)

(73) Assignee: Walker Digital, LLC, Stanford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/962,081

(22) Filed: Dec. 7, 2010

(65) Prior Publication Data

US 2011/0073646 A1    Mar. 31, 2011

Related U.S. Application Data

(63) Continuation of application No. 12/468,582, filed on May 19, 2009, now Pat. No. 7,845,555, which is a continuation of application No. 11/668,498, filed on Jan. 30, 2007, now Pat. No. 7,533,810, which is a continuation of application No. 10/689,790, filed on Oct. 21, 2003, now Pat. No. 7,168,617, which is a continuation-in-part of application No. 09/659,752, filed on Sep. 11, 2000, now Pat. No. 6,634,550.

(60) Provisional application No. 60/210,094, filed on Jun. 7, 2000.

(51) Int. Cl.
*G06F 7/08* (2006.01)
(52) U.S. Cl. ....................................................... 235/383
(58) Field of Classification Search .................. 235/378, 235/383, 385
See application file for complete search history.

(56) References Cited

U.S. PATENT DOCUMENTS

| 3,129,004 A | 4/1964 | Ritzler |
| 3,468,476 A | 9/1969 | Keegan |
| 4,815,741 A | 3/1989 | Small |
| 4,854,590 A | 8/1989 | Jolliff et al. |
| 5,076,613 A | 12/1991 | Kovacs |
| 5,085,435 A | 2/1992 | Rossides |
| 5,099,232 A | 3/1992 | Howes |
| 5,173,851 A | 12/1992 | Off et al. |

(Continued)

FOREIGN PATENT DOCUMENTS

WO    WO 98/43149    10/1998

(Continued)

OTHER PUBLICATIONS

"Omron ITM", The Magazine of Bank Management, Jan. 1989 Products & Services; p. 56, 1 pp.

(Continued)

*Primary Examiner* — Seung Lee
(74) *Attorney, Agent, or Firm* — Fincham Downs LLC; Michael D. Downs

(57) ABSTRACT

According to one embodiment, a game presentation such as a virtual slot machine may be displayed by a display device associated with a point of sale (POS) terminal.

17 Claims, 13 Drawing Sheets

U.S. PATENT DOCUMENTS

| | | | |
|---|---|---|---|
| 5,269,522 A | 12/1993 | Chagoll et al. | |
| 5,361,871 A | 11/1994 | Gupta et al. | |
| 5,368,129 A | 11/1994 | Von Kohorn | |
| 5,373,440 A * | 12/1994 | Cohen et al. | 705/14.12 |
| 5,392,066 A | 2/1995 | Fisher et al. | |
| 5,620,182 A | 4/1997 | Rossides | |
| 5,729,697 A | 3/1998 | Schkolnick et al. | |
| 5,806,852 A | 9/1998 | Howes | |
| 5,813,913 A | 9/1998 | Berner et al. | |
| 5,848,399 A * | 12/1998 | Burke | 705/27.2 |
| 5,857,175 A | 1/1999 | Day et al. | |
| 5,859,414 A | 1/1999 | Grimes et al. | |
| 5,883,620 A | 3/1999 | Hobbs et al. | |
| 5,912,743 A | 6/1999 | Kinebuchi et al. | |
| 5,918,211 A | 6/1999 | Sloane | |
| 5,933,811 A | 8/1999 | Angles et al. | |
| 5,933,813 A | 8/1999 | Teicher et al. | |
| 5,939,695 A | 8/1999 | Nelson | |
| 5,962,831 A | 10/1999 | Byrley | 235/380 |
| 5,979,757 A | 11/1999 | Tracy et al. | 235/383 |
| 6,035,279 A * | 3/2000 | Montangero et al. | 705/14.14 |
| 6,048,268 A | 4/2000 | Humble | 463/17 |
| 6,401,074 B1 * | 6/2002 | Sleeper | 705/14.65 |
| 6,439,997 B1 | 8/2002 | Brasseur et al. | 463/40 |
| 6,443,843 B1 | 9/2002 | Walker et al. | 463/42 |
| 6,447,395 B1 | 9/2002 | Stevens | 463/18 |
| 7,168,617 B2 * | 1/2007 | Walker et al. | 235/383 |
| 2002/0013744 A1 | 1/2002 | Tsunenari et al. | 705/28 |
| 2002/0107610 A1 | 8/2002 | Kaechler et al. | 700/232 |
| 2002/0138342 A1 | 9/2002 | Clark et al. | 705/14 |
| 2002/0143619 A1 | 10/2002 | Laurie | |
| 2003/0066883 A1 | 4/2003 | Yu | 235/382 |

FOREIGN PATENT DOCUMENTS

WO    WO 9843149 A2 * 10/1998

OTHER PUBLICATIONS

Frensholt, Carol, "The New Buy-Ographics; Supermarket Promotions; Includes Related Articles", Supermarket Business, May 1995, vol. 50;No. 5; p. 26; ISSN: 0196-5700, 6 pp.

Abstract: "POS Influences Buyer Behavior", Retail World, May 1997, 1 pp.

Brochure: "@pos.com", copyright 1999, 4 pp.

Brochure: "NCR ScanMaster", copyright 1999, NCR Corporation, 4 pp.

"Catalina Marketing Solidifies In-Store Capabilities Through Acquisition of CompuScan," PR Newswire, Apr. 30, 1999, Section: Financial News, 2 pp.

Orenstein, David, "Web Service Targets Shoppers at Checkout", Computerworld, Jul. 5, 1999, News—Early; p. 25, 2 pp.

Sciacca, Patrick; Zimmermann, Kim Ann, "The Right Moves", Supermarket News, Dec. 13, 1999, p. 19; ISSN: 0039-5803, 5 pp.

"Tie-up to Combine E-Service, E-Payment at Point of Sale", Business World, Mar. 6, 2000, p. 32, 1 pg.

Pepe, Michael, "@POS.Com Grants License to Hand Held Products—Vendors Team to Offer POS Solutions", Computer Reseller News, Mar. 20, 2000, 2 pp.

"In-Store Instant-Win Games", (http://www.catmktg.com/manufacturer/frm_main_instant.htm), download date: May 10, 2000, 1 pg.

"Welcome to @pos.com: IPOS Transaction Computer", (http://atpos.com/prod_serv/ipos.html), download date: May 10, 2000, 1 pg.

"Welcome to @pos.com: Transaction Platforms", (http://atpos.com/prod_serv/platforms.html), download date: May 10, 2000, 1 pg.

Ellis, Kristi Lamont, "Interactive Selling" Point of Purchase Magazine, (http://www.popmag.com/archives/0200/feb00stor2.html), May 19, 2000, 7 pp.

Hughes, Arthur Middleton, "Customer Specific Marketing", Database Marketing Institute (wysiwyg://98/http://www.dbmarketing.com/articles/art115.htm), download date: May 30, 2000, 5 pp.

"You Can Win Pick up an Entry Blank at any Big Y World Class Market", (http://www.bigy.com/promo/winprmo.htm), download date: May 30, 2000, 2 pp.

"Retail Solution Show Special-Alphanumeric Advocates In-Store TV Advertising", Retail Week, Jun. 2, 2000, 2 pp.

Notice of Allowability for U.S. Appl. No. 09/659,752 mailed Dec. 23, 2002, 3 pp.

Notice of Allowability for U.S. Appl. No. 09/659,752 mailed Dec. 23, 2002, 3 pp.

Office Action for U.S. Appl. No. 09/659,752 mailed Mar. 28, 2002, 6 pp.

Notice of Allowance for U.S. Appl. No. 11/668,498 mailed Jan. 14, 2009, 7 pp.

Office Action for U.S. Appl. No. 11/668,498 mailed Jun. 27, 2008, 8 pp.

Office Action for U.S. Appl. No. 11/668,498 mailed Dec. 31, 2007, 5 pp.

Notice of Allowance for U.S. Appl. No. 10/689,790 mailed Dec. 2, 2006, 6 pp.

Office Action for U.S. Appl. No. 10/689,790 mailed May 3, 2005, 7 pp.

Office Action for U.S. Appl. No. 10/689,790 mailed Feb. 24, 2006, 9 pp.

Office Action for U.S. Appl. No. 10/689,790 mailed Mar. 3, 2006, 10 pp.

Notice of Allowance for U.S. Appl. No. 12/468,582 mailed Jul. 30, 2010, 7 pp.

Office Action for U.S. Appl. No. 12/468,582 mailed Feb. 16, 2010, 5 pp.

* cited by examiner

| COUPON IDENTIFIER 502 | COUPON MESSAGE 504 | COUPON SYMBOL 506 | COUPON RULE 508 |
|---|---|---|---|
| C-7872 | 50 CENTS OFF ANDY'S 1 LB. BAKING CHOCOLATE (P-7872) | AN IMAGE OF A SECTION OF BAKING CHOCOLATE, ALONG WITH THE COUPON MESSAGE | IF P-7872 WAS PURCHASED BY CUSTOMER DURING LAST TRANSACTION BUT NOT DURING THIS TRANSACTION, THEN C-7872 IS A POSSIBLE OUTCOME |
| C-2839 | 20% OFF ALL BRAND Y CEREALS (LIMIT 1 PER CUSTOMER) | AN IMAGE OF BRAND Y CEREAL BOX, ALONG WITH THE COUPON MESSAGE | IF A BRAND Y CEREAL IS BEING PURCHASED BY CUSTOMER, THEN C-2839 IS A POSSIBLE OUTCOME |
| C-2735 | 30 CENTS OFF ALL BRAND G YOGURT (EXPIRES 5/3/02) | AN IMAGE OF YOGURT CONTAINER, ALONG WITH THE WORDS "BRAND G YOGURT - 30% OFF" | IF CUSTOMER HAS SHOPPED AT STORE AT LEAST 3 TIMES, THEN C-2735 IS A POSSIBLE OUTCOME |

| UPSELL IDENTIFIER 602 | UPSELL MESSAGE 604 | UPSELL SYMBOL 606 | UPSELL RULE 608 |
|---|---|---|---|
| U-372 | IF YOU ROUND UP YOUR TOTAL TO THE NEAREST DOLLAR, YOU CAN GRAB A PACK OF BIG RED GUM | AN IMAGE OF BIG RED GUM, ALONG WITH THE UPSELL MESSAGE | IF AMOUNT OF CHANGE IS AT LEAST $0.23 BUT NOT MORE THAN $0.45, THEN U-372 IS A POSSIBLE OUTCOME |
| U-239 | IF YOU ROUND UP YOUR TOTAL TO THE NEAREST DOLLAR, YOU CAN EXCHANGE YOUR BRAND X BEANS FOR BRAND X QUALITY BEANS | AN IMAGE OF BRAND X QUALITY BEANS, ALONG WITH THE UPSELL MESSAGE | IF BRAND X BEANS IS INCLUDED IN THE PRODUCTS TO BE PURCHASED, THEN U-239 IS A POSSIBLE OUTCOME |
| U-298 | IF YOU ROUND UP YOUR TOTAL TO THE NEAREST DOLLAR, YOU CAN ADD 'FAST CAR' MAGAZINE TO YOUR PURCHASE | CURRENT COVER OF 'FAST CAR' | IF AMOUNT OF CHANGE IS AT LEAST $0.65, THEN U-298 IS A POSSIBLE OUTCOME |

| CUSTOMER IDENTIFIER 702 | NAME 704 | ADDRESS 706 | TRANSACTION IDENTIFIERS 708 | | |
|---|---|---|---|---|---|
| | | | TRANSACTION #1 710 | TRANSACTION #2 712 | TRANSACTION #3 714 |
| C-3289289 | DAN MANN | 123 MAPLE STREET | T-348927 | N/A | N/A |
| C-2348164 | IDA JONES | 456 PINE STREET | T-4894847 | T-6894948 | T-2982348 |
| C-8342789 | MARY SMITH | 789 OAK STREET | T-3095904 | T-3089349 | N/A |

FIG. 7

| TYPES OF POSSIBLE OUTCOMES 802 | LIKELIHOOD OF OCCURRENCE OF TYPE OF OUTCOME 804 |
|---|---|
| UPSELL OFFER | 15% |
| COUPON | 20% |
| ONE OF THE PRODUCTS THAT THE CUSTOMER WANTS TO BUY FOR FREE | 5% |
| ONE OF THE PRODUCTS THAT THE CUSTOMER WANTS TO BUY FOR 50% OFF THE RETAIL PRICE | 10% |
| NO PRIZE | 50% |

← 1000

| TRANSACTION IDENTIFIER: T-348927 | CUSTOMER IDENTIFIER: C-3289289 |
| --- | --- |
|  | 1004 |
| POS IDENTIFIER: POS-23908 | DATE: 5/30/00 |
| 1006 | 1008 |
| CASHIER IDENTIFIER: CA-2JR290 | TIME: 04:26 |
| 1010 | 1012 |
| SUBTOTAL=SUM OF RETAIL PRICES: $4.61 | TOTAL (INCLUDES TAXES): $5.03 |
| 1014 | 1016 |
| PRODUCT IDENTIFIERS: P-961 | OUTCOME: U-398 OFFERED TO CUSTOMER. CUSTOMER ACCEPTED UPSELL OFFER |
| 1018 | 1020 |
| FINAL TOTAL (TOTAL + THE OUTCOME IS TAKEN INTO ACCOUNT): $6.00 ||
| 1022 ||

FIG. 10

GAME PRESENTATION IN A RETAIL ESTABLISHMENT

CROSS REFERENCE TO RELATED APPLICATIONS

This application is a continuation of U.S. patent application Ser. No. 12/468,582 filed May 19, 2009 entitled GAME PRESENTATION IN A RETAIL ESTABLISHMENT and issued as U.S. Pat. No. 7,845,555 on Dec. 7, 2010, which is a continuation of U.S. patent application Ser. No. 11/668,498 filed Jan. 30, 2007 and issued as U.S. Pat. No. 7,533,810 on May 19, 2009, which is a continuation of U.S. patent application Ser. No. 10/689,790 filed Oct. 21, 2003 and issued as U.S. Pat. No. 7,168,617 on Jan. 30, 2007, which is a continuation-in-part of U.S. patent application Ser. No. 09/659,752 filed Sep. 11, 2000 and issued as U.S. Pat. No. 6,634,550 on Oct. 21, 2003 and which claims the benefit of priority of U.S. Provisional Patent Application No. 60/210,094 filed Jun. 7, 2000.

Each of the above-referenced applications is incorporated by reference herein in its entirety.

The following U.S. patent applications include subject matter that is related to the present application:

U.S. patent application Ser. No. 09/538,773 filed Mar. 30, 2000, entitled ENTERTAINMENT LAYER OVERLAID ON ONLINE TRANSACTIONS;

U.S. patent application Ser. No. 09/606,566 filed Jun. 29, 2000, entitled SYSTEM TO PROVIDE GAME PLAY FOR PRODUCTS and issued Sep. 3, 2002 as U.S. Pat. No. 6,443,843; and which claims the benefit of U.S. Provisional Patent Application No. 60/204,673 filed May 17, 2000, entitled SHOPPING AS GAMBLING;

U.S. patent application Ser. No. 09/679,186 filed Oct. 3, 2000, entitled SYSTEMS AND METHODS WHEREIN A PLAYER INDICATES AN ITEM THAT MAY BE RECEIVED BASED ON A GAME EVENT OUTCOME ASSOCIATED WITH THE PLAYER; and which claims the benefit of U.S. Provisional Patent Application No. 60/206,965 filed May 25, 2000, entitled METHODS AND APPARATUS FOR PROVIDING LOTTERY PRIZES ALTERNATIVE TO CASH PAYMENT;

U.S. patent application Ser. No. 09/604,898 filed Jun. 28, 2000 and now abandoned, entitled METHOD AND APPARATUS FOR CONDUCTING OR FACILITATING A PROMOTION, and which claims the benefit of U.S. Provisional Patent Application No. 60/183,391 filed Feb. 18, 2000, entitled STORED OUTCOMES ON A PDA;

The disclosures of each of the above applications are incorporated herein by reference as part of the present disclosure.

BACKGROUND

Customers can spend significant time waiting while in a store. Waiting in line at the checkout counter of a store, and standing at the counter while one's purchases are rung up, can frustrate shoppers at a store. Delays in checkout may become so frustrating to shoppers in some cases that they abandon their purchases and walk out of the store without buying, causing the store to lose revenue.

Programs called "Checkout Coupon" and "Checkout Direct" are provided by Catalina Marketing, Inc. of St. Petersburg, Fla. These programs deliver coupons or other incentives to the point of sale and may be targeted to the individual customer. Catalina Marketing, Inc. also sponsors an in-store instant-win game to give customers incentives to shop at stores for which the game is made available.

It would be beneficial both to customers and to retail establishments if the shopping experience, and particularly the process of checking out purchases, could be made more entertaining for the customer. A store that is able to make the shopping experience more entertaining may gain a competitive advantage and draw customers away from other stores.

BRIEF DESCRIPTION OF THE DRAWINGS

FIG. 5 is a tabular representation of an embodiment of a coupon database that is stored in the central controller of FIG. 2;

FIG. 6 is a tabular representation of an embodiment of an upsell database that is stored in the central controller of FIG. 2;

FIG. 7 is a tabular representation of an embodiment of a customer database that is stored in the central controller of FIG. 2;

FIG. 10 shows a typical entry in an embodiment of a transaction database that is stored in the central controller of FIG. 2;

DETAILED DESCRIPTION

By practicing the present invention, retailers are able to make the shopping experience more entertaining and interesting to customers, thereby attracting customers to their stores.

The following definitions apply in this specification and in the appended claims:

benefit: includes one or more of a free product, a discount offer, an upsell, a coupon, and a cash prize.

customer identifier: a code that uniquely identifies a customer.

image: a pictorial representation of a physical entity.

indicia: an image or other symbol portrayed as a constituent of a virtual slot machine reel.

product: a good and/or service.

product identifier: a code that uniquely identifies a product.

random outcome: a result of a random or psuedo-random process undertaken to determine whether a benefit will be awarded to an individual.

retail price: a price that a product costs in the absence of any promotion or discount.

shelf: any structure or location, separate from a point-of-sale terminal, for displaying products for purchase.

symbol: includes one or more of an image, a logo, and a string of alphanumeric characters.

upsell: a proposal to a customer that he or she add an additional product or a replacement product to a transaction.

Figure 1:
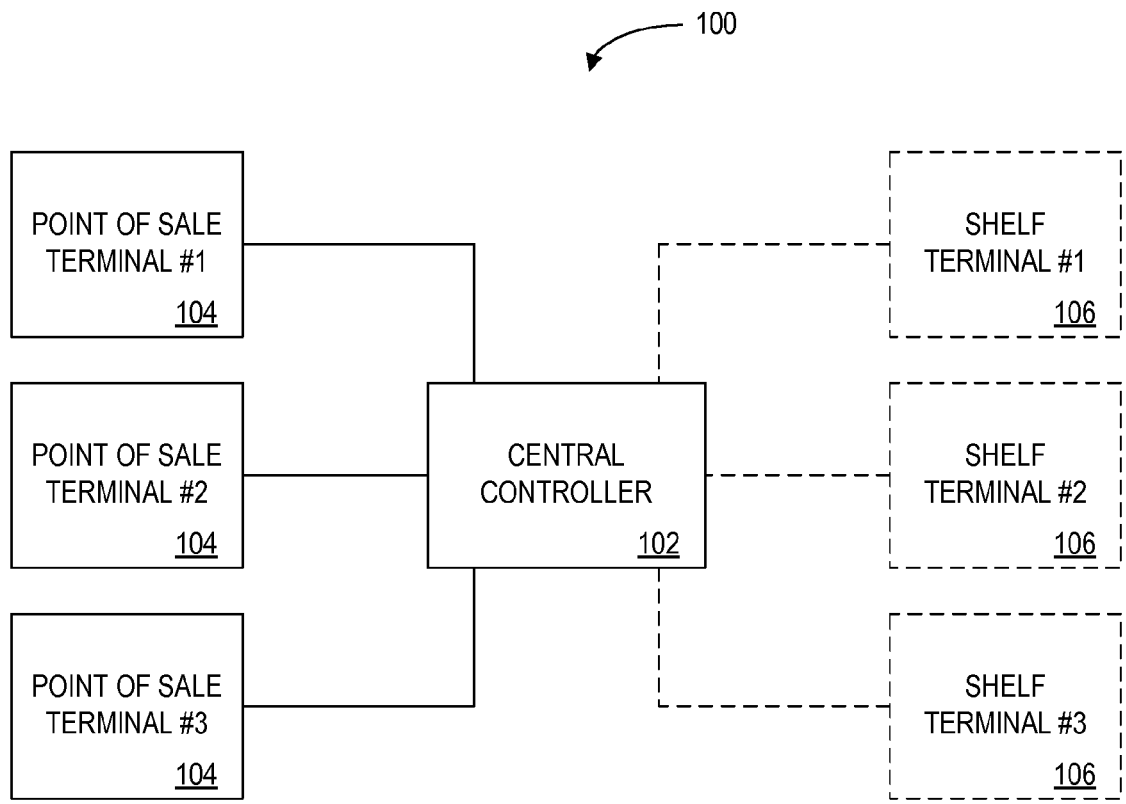
FIG. 1 is a block diagram representation of a system provided in accordance with an embodiment of the invention.

Referring to FIG. 1, a block diagram illustrates a system 100 in which the present invention may be applied. The system 100 includes a central controller 102 and a plurality of point of sale (POS) terminals 104 connected for data communication with the central controller 102. The POS terminals are installed at a retail store (not separately shown) and the central controller may, but need not, also be installed at the retail store. Although three POS terminals are shown in the drawing, it should be understood that the number of POS terminals in the system may be greater than or less than three.

The system may also include a plurality of terminals 106 installed at shelves in the retail store. Because the shelf terminals are not required for some aspects of the invention, the terminals 106 are shown in phantom in the drawing. If present, the shelf terminals 106 are connected for data communication with the central controller 102.

Figure 2:
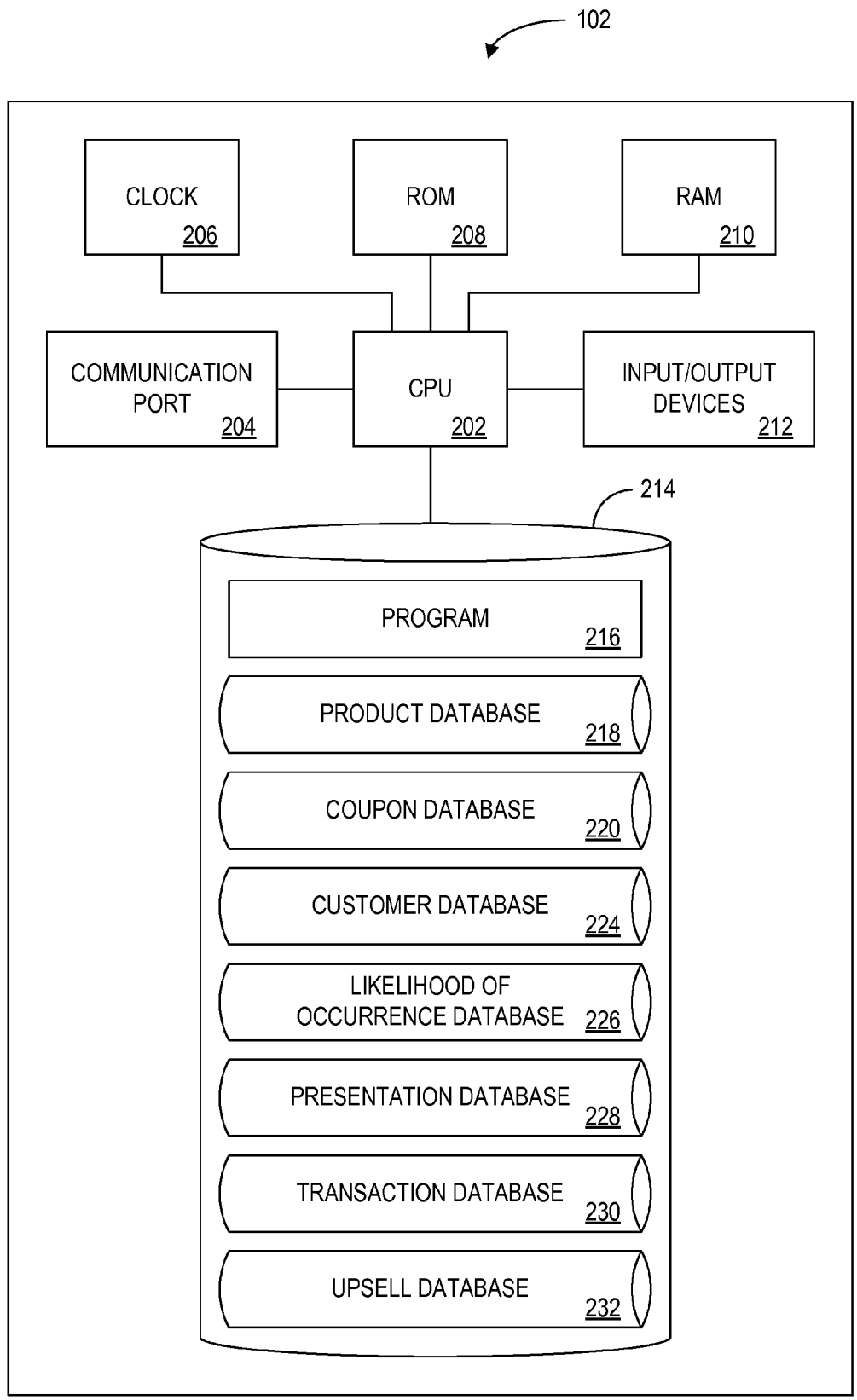
FIG. 2 is a block diagram representation of an embodiment of a central controller that is a component of the system of FIG. 1.

Details of the central controller 102 are shown in block diagram form in FIG. 2. The hardware components of the controller 102 may be constituted by conventional computer hardware, such as a mini computer or a server computer of the type employed to manage a system of POS terminals. The controller 102 includes a processor or microchip 202 that is in communication with or otherwise uses or includes one or more communication ports 204. The communication port 204 is of a type to enable the controller 102 to engage in data communication with the POS terminals 104 and the shelf terminals 106, if present. The data communication between the central controller and the terminals may be carried out by conventional data networking facilities such as an Ethernet local area network, a token ring type local area network or a wireless communication facility.

The controller 102 also includes an internal clock element 206 which controls the timing of operations performed by the processor 202. Also connected to the processor 202 are read only memory (ROM) 208 and random access memory (RAM) 210, which respectively provide fixed and working data storage for the processor 202. Also operatively connected to the processor 202 may be one or more input/output devices 212. Such devices may include a printer and an operator terminal with a display, keyboard and mouse.

Also included in the controller 102 is a mass storage device 214 which stores information, software, programs, databases, etc. The storage device 214 preferably comprises an appropriate combination of magnetic, optical and/or semi-conductor memory, and may be constituted by one or more hard disks. The processor 202 and the storage device 214 may each be, for example: (i) located entirely within a single computer or other computing device; or (ii) connected to each other by a remote communication medium, such as a serial port cable, telephone line or radio frequency transceiver.

The software and other information stored on the storage device 214 preferably includes some or all of the following: a control program 216 for operating the controller 102; a product database 218 for storing information about products sold by the retail store served by the controller 102; a coupon database 220 for storing information about coupon offers that may be made through the system 100; a customer database 224 for storing information about one or more customers; an outcome database 226 for storing information to be used in determining random outcomes in accordance with the invention; a presentation database 228 for storing information, graphics, etc. for interfaces that may be presented by the system in connection with random outcomes; a transaction database 230 for storing information related to transactions handled by the system 100; and an upsell database 232 for storing information concerning upsells that may be offered to customers through the system 100.

Each of the databases 218, 220, 224, 226, 228, 230 and 232 and their use and potential data structure will be discussed in more detail below. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information only. Thus, those skilled in the art will understand that the number and content of the entries can be different from those illustrated herein. Not all of the databases 218, 220, 224, 226, 228, 230 and 232 will be used or needed in every embodiment of the system 100.

The control program 216 controls the processor 202. The processor 202 preferably performs instructions of the control program 216, and thereby operates in accordance with the present invention, and particularly in accordance with the methods described in detail herein. The control program 216 may be stored in a compressed, uncompiled and/or encrypted format. The control program 216 furthermore includes program elements that may be necessary such as an operating system, a database management system and device drivers for allowing the processor 202 to interface with peripheral devices, databases, etc. Appropriate program elements are known to those skilled in the art, and need not be described in detail herein. According to an embodiment of the present invention, the instructions of the program 216 may be read into a main memory from another computer-readable medium, such as the storage device 214. Execution of sequences of the instructions in the program 216 causes the processor 202 to perform the process steps described herein. In alternative embodiments, hard wired circuitry may be used in place of, or in combination with, software instructions for implementation of some or all of the methods of the present invention. Thus, embodiments of the present invention are not limited to any specific combination of hardware and software.

Figure 3:
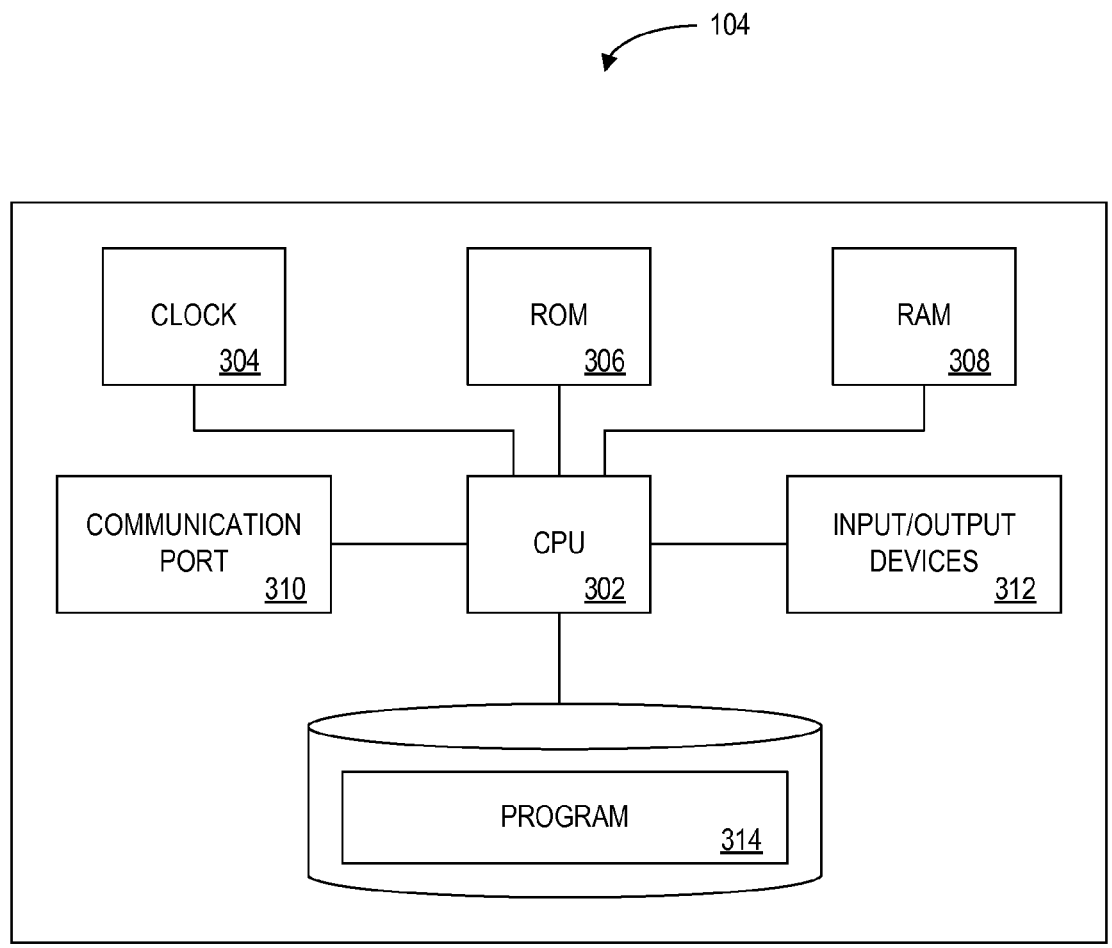
FIG. 3 is a block diagram representation of an embodiment of a point of sale terminal that is a component of the system of FIG. 1.

FIG. 3 is a block diagram that illustrates a typical one of the POS terminals 104. As seen from FIG. 3, each POS terminal 104 may be implemented with a conventional microprocessor-based architecture, including conventional components such as a processor 302, a clock element 304, ROM 306, RAM 308, a communications port 310 and input/output devices 312. Stored in one or both of the ROM 306 and the RAM 308 or in another storage device is a program 314 for controlling operation of the processor 302.

The POS terminals 104 may generally be constituted by conventional hardware arrangements for such devices, except that, for certain embodiments of the invention, it is desirable that the POS terminals 104 include a suitable display, such as a CRT or other display device capable of displaying computer generated images, graphics, photographic images or the like. Each POS terminal 104 may include two or more displays, including one facing the POS terminal operator and another facing the customer. It is preferred that the display facing the customer be capable of displaying images. In other respects the input/output devices 312 may be conventional, including, for example, a bar code scanner, an operator keypad, a magnetic stripe card reader such as a card authorization terminal, and a receipt printer.

Figure 4:
FIG. 4 is a tabular representation of an embodiment of a product database that is stored in the central controller of FIG. 2.

FIG. 4 shows a table 400 that is a representation of the product database 218. The table 400 includes a column 402 for storing product identifier codes, a column 404 for storing names of the respective products, a column 406 for storing prices of the respective products, and a column 408 for storing data representative of images of the respective products. Instead of storing the image data itself in column 408, the column 408 may store pointers to locations in a separate image database, which is not shown.

Although not represented by columns in the drawing, additional data fields that may be supported by the product database may include data indicative of the manufacturers of the respective products, quantity of inventory on hand, and expiration dates for respective portions of the inventory.

Although only four entries are shown in the table of 400, it is contemplated that in practical embodiments of the invention a large number of entries, corresponding to all of the products carried by a retail store, may be stored in the product database.

FIG. 5 shows a table 500 that represents an example of the coupon database 220 (FIG. 2). The table 500 has a column 502 for storing codes that identify coupons, a column 504 for storing a message to be displayed on the POS terminal in regard to respective coupons when the respective coupon is to be awarded as a benefit to the customer, a column 506 which stores either an image for indicating the respective coupon, or a pointer to a separate image database in which the coupon image is stored, and a column 508 for storing coupon rules. The coupon rules indicate under what circumstances the respective coupons may be provided as a benefit to the customer. Such a rule may provide, for example, that an award of a certain coupon may be awarded if a product corresponding to the coupon was purchased in a previous transaction but not in the current transaction. Another such rule may provide that a certain coupon may be awarded if the customer has shopped at the store on at least three prior occasions.

Entries for three coupons are shown in table 500 but the number of entries could be larger or smaller.

FIG. 6 shows a table 600 that illustrates the upsell database 232. In table 600 column 602 lists identifying codes that indicate the respective upsell offers. Column 604 lists, for each respective upsell offer, a message to be provided to the customer to state the terms of the upsell offer. Column 606 in table 600 contains an image (or a pointer to an image) with regard to each respective upsell offer. The respective images are used to present an outcome awarding an upsell offer to a customer. The presentation may take the form of, e.g., the above-mentioned virtual slot machine. Column 608 in table 600 lists respective rules that govern whether the upsell offers are permissible outcomes of a random process for determining whether a benefit is to be awarded to the customer.

FIG. 7 shows a table 700 that represents an example of the customer database 224. Table 700 includes a column 702 that stores customer identifiers, and columns 704 and 706 for respectively listing customer names and addresses. Also included in table 700 is a group of columns 708 for storing transaction identifiers that identify transactions engaged in by the respective customers. Under the heading of the transaction identifiers 708 are columns 710, 712 and 714 that respectively correspond to a first transaction entered into by a respective customer, a second transaction (if any) and a third transaction (if any). Although only three columns for transactions are shown in the drawing, it is possible to store a considerably larger number of transactions for each customer.

One possible purpose of the customer database is to provide a key, linking transaction identifiers to customer identifiers, so that customers' purchasing histories can be readily assembled, e.g., by reference to the transaction database which is described below.

Figure 8:
FIG. 8 is a tabular representation of an embodiment of a likelihood of occurrence database that is stored in the central controller of FIG. 2.

FIG. 8 shows a table 800 that illustrates the outcome database 226. Table 800 includes a column 802 that lists types of outcomes that may be presented to the customer as the result of a random process. The types of outcomes include upsell offers, coupons, free products (i.e. the customer is not required to pay for a product that the customer has selected for purchase), discounts on products selected by the customer, or no prize (i.e. no benefit provided to the customer as the result of a random outcome).

Also included in table 800 is a column 804 that lists the likelihood or probability of occurrence of each type of outcome listed in column 802.

It should be noted that other types of benefits may be presented to the customer as a result of a random outcome in addition to the benefits listed in column 802. Examples of other benefits that may be awarded include cash prizes, the designation of all or any number of products selected for purchase to be free of charge, or a product that the customer has not selected for purchase. If a product not selected for purchase is to be awarded, the system may select the product to be awarded by taking into account the products selected for purchase by the customer, the customer's purchasing history, or the transaction total.

A benefit to be awarded to a customer could include a rebate on a product (either a product selected for purchase or a product not selected for purchase). Such a rebate can be communicated immediately after checkout. For example, a rebate may be provided by the cashier in the form of a check or coupon. Such a rebate can be communicated some time after checkout. For example, a rebate may be provided to the customer through email or postal mail.

A benefit to be awarded to a customer could include a discount on a product subscription. A product subscription is an arrangement whereby the customer receives a discount in exchange for agreeing in advance to purchase a quantity of a product to be delivered in installments over time. Arrangements for product subscriptions are disclosed in commonly assigned U.S. Pat. No. 5,970,470, which is entitled, "System and Method for Establishing and Managing Subscription Purchase Agreements Including Commitments to Purchase Goods Over Time At Agreed Upon Prices."

According to another aspect of benefits that may be awarded, the system may select for awarding free of charge one of the products selected for purchase by the customer, or the system may select several such products and allow the customer to pick one of the products selected by the system to be awarded free of charge.

Moreover, one or more of the types of benefits listed in column 802 may be omitted, and/or others may be provided. Also, the probabilities of occurrence listed in column 804 may be changed. Among other possibilities, the likelihood of occurrence of a given outcome may vary with certain circumstances. For example, in one embodiment the table shown in FIG. 8 may be used only for relatively large orders; a different table, with lower likelihoods of free product awards or discounts, may be used with smaller orders. More than two different outcome tables may be used, with the table to be used depending on circumstances such as size of order, make up of order, customer identity, customer purchasing history, time of day, day of the week, number of coupons available, number of upsells available, etc.

As will be discussed further below, once a particular type of outcome has been determined, a particular outcome of that type may be selected. For example, when it is determined that the customer is to be awarded free of charge one of the products selected for purchase, the system then selects a particular one of the products to be awarded. As other examples, when an upsell or a coupon is to be awarded, then a particular upsell or coupon may be selected. As to a particular offer such as a coupon or an upsell, the likelihood that the offer will be selected if that type of offer is to be awarded may depend on factors such as the relative amounts that respective sponsors are willing to pay to the retail establishment.

It is also contemplated that determining the type of outcome may determine the outcome itself. For example, in one embodiment, if the type of outcome is determined to be an upsell, there may only be one upsell to be offered. That is, only one outcome is included in the set of outcomes to which the type of outcome corresponds. As another example, if the transaction consists of only one product selected for purchase, then determining that the type of outcome is awarding a purchased product for free means that the sole selected product is awarded free of charge.

It is also contemplated that overlapping probabilities may be used to determine one or more occurrences of various types of outcomes. For example, there may be a 5% chance of a first type of outcome (e.g., an upsell offer) and simultaneously a 50% chance of a second type of outcome (e.g., a coupon). Thus it is possible (with probability 5%×50%=2.5%) that a customer win both an upsell offer and a coupon. Similarly, as one of the outcomes can be "No Prize" (see, e.g., FIG. 9), it is possible that one outcomes (or no outcomes) results.

Figure 9:
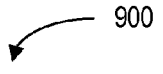
FIG. 9 is a tabular representation of an embodiment of a presentation database that is stored in the central controller of FIG. 2.

FIG. 9 shows a table 900 that illustrates the presentation database 228. In table 900, column 902 lists outcomes that may be produced by a random process. Column 904 indicates how the respective outcomes are to be presented via a virtual slot machine interface that is displayed to the customer via a POS terminal 104.

In the virtual slot machine interface three virtual slot reels are presented, and on each reel a number of indicia represented on the "rim" of the reel. These indicia may include a variety of symbols including images of products that may be won or coupons that may be awarded, and symbols representing upsells that may be awarded. The three reels "spin", as represented by rapid movement of the symbols in an upward or downward direction, until the time an outcome is determined. In general, consistent with the "slot machine" metaphor, a favorable outcome is indicated by three identical symbols or indicia that are horizontally aligned with each other at a "pay line". As is well known, the "pay line" of a slot machine is a horizontal line that indicates which slot machine reel indicia are to be associated with the outcome of a play cycle of a slot machine. The symbol or indicia may be an image that represents some aspect of the benefit to be awarded, such as an image that represents a product to be awarded free of charge, or a product to be discounted or for which a coupon will be provided.

FIG. 10 illustrates a typical entry 1000 stored in the transaction database 230. The entry 1000 includes a field 1002 that contains a unique identifying code for the transaction in question, a field 1004 that contains the customer identifier (preferably from the customer database) for the customer involved in the transaction, a field 1006 that contains a code for identifying the POS terminal that handled the transaction, a field 1008 that contains the date of the transaction, a field 1010 that contains a code to identify the POS terminal operator who handled the transaction, a field 1012 that indicates the time at which the transaction occurred, a field 1014 that contains the total price for the transaction before sales tax (subtotal), a field 1016 that contains the total price for the transaction including sales tax, a field 1018 that contains product identifying codes for the products purchased in the transaction, a field 1020 that records the outcome of a random process applied in connection with the transaction, and a field 1022 that indicates the effect of the outcome on the total transaction price. In the particular example indicated in FIG. 10, fields 1020 and 1022 indicate that the random outcome was that a certain upsell offer was made to the customer and that the customer accepted the offer, as a result of which the total transaction price was rounded up from $5.03 to $6.00. It may be assumed that the product offered as part of the upsell had a retail price of more than $0.97. For example, the product offered as part of the upsell offer may have been a magazine that is stocked adjacent to the POS terminal.

Figure 11:
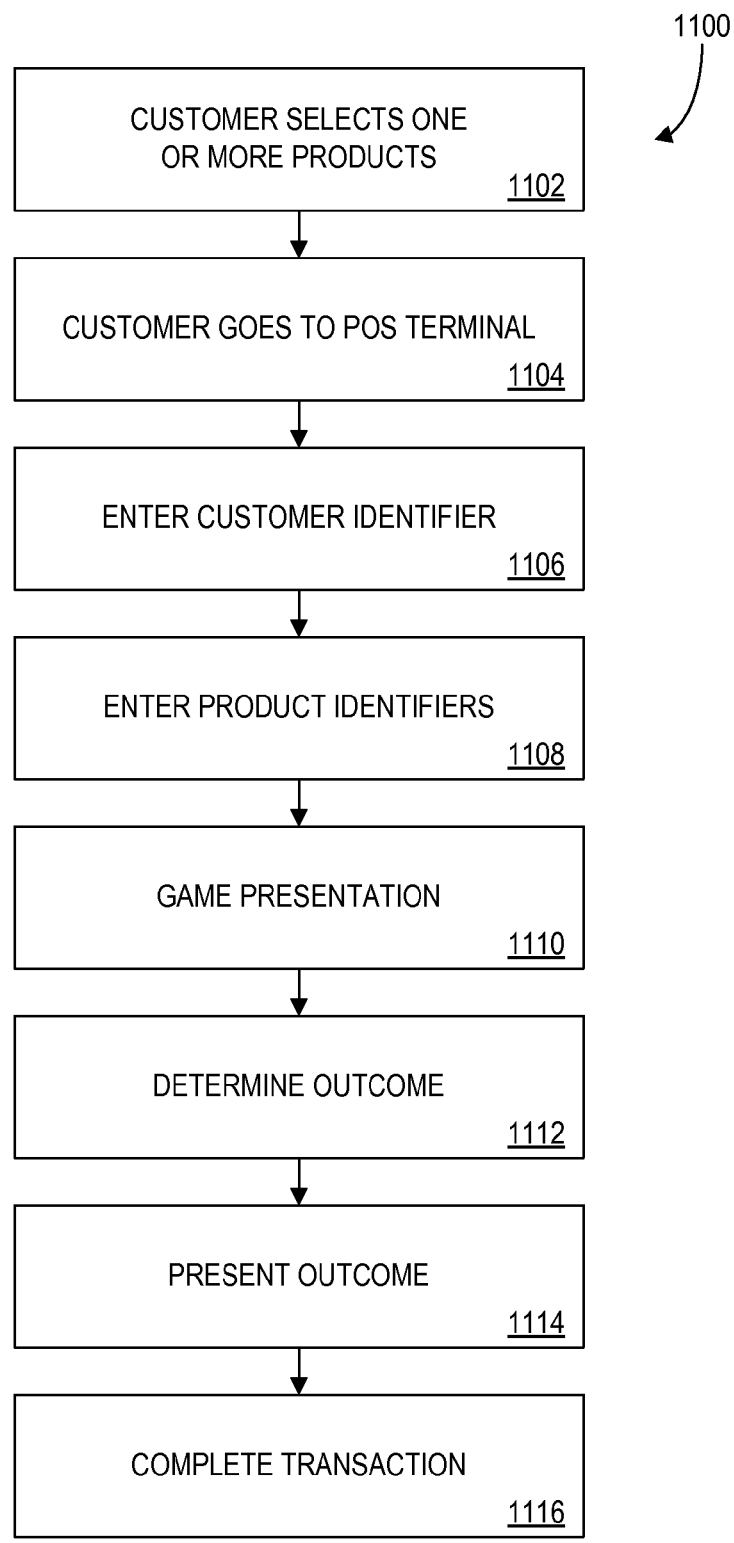
FIG. 11 is a flow chart that illustrates an embodiment of a process carried out in the system of FIG. 1 according to an aspect of the invention.

FIG. 11 shows a flow chart 1100 that illustrates a process carried out in accordance with the invention. According to a first step 1102 in the process 1100, a customer selects one or more products to purchase. This may occur, for example, by the customer removing the products from shelves in the store and placing the products in a shopping cart. Then, at step 1104, the customer goes to a POS terminal, bringing along the products that have been selected for purchase. The POS terminal may either be attended by a POS terminal operator who is an employee of the store, or the POS terminal may be a self-checkout terminal that is to be operated by the customer himself or herself.

Then, at step 1106, a customer identifying code is entered into the POS terminal. This may be done by interfacing a magnetic stripe card such as a shopper identification card to a card reader that is a peripheral device for the POS terminal. As an alternative it is contemplated that the customer identifying code may be entered by other techniques, including entering of alphanumeric data via a keypad that is part of the POS terminal.

Because the customer undertaking the transaction is identified by the identifying code, the central controller 102, which is in communication with the point of sale terminal in question, may be able to access purchasing history and other information relating to the customer by means of the customer database 224 and the transaction database 230. This information, in turn, may be used to determine which offers are made available as possible outcomes of a random selection process to be undertaken in connection with the transaction. Consequently, the random outcome produced by the random selection process may depend in part on the purchasing history or other information relating to the customer in that the likelihood of occurrence of some or all of the possible outcomes may be determined on the basis of the purchasing history or other information. Such other information may include information relating to benefits that have previously been awarded to the customer.

At step 1108 product identifying codes are entered for the products selected for purchase by the customer and brought for checkout to the POS terminal and the codes are received by the POS terminal. It is contemplated that the product identifiers may be entered by any conventional technique, including scanning bar codes carried on the products.

After steps 1106 and 1108, or as one or both of those steps are being performed, a game display is presented (step 1110) via a display screen associated with the POS terminal. The game display may take many forms, but in a preferred embodiment of the invention represents a virtual slot machine with spinning "reels" of game indicia. In one embodiment of the invention, at least some of the indicia are images that represent products for which identifying codes are entered at step 1108. The display screen through which the game display is provided may be controlled by the associated POS terminal or by the central controller.

At step 1112 an outcome is determined from among a number of possible outcomes. The outcome is selected by a random or pseudo-random process from among a number of possible outcomes and in accordance with predetermined probabilities or likelihoods of the possible outcomes. For example, if a certain possible outcome has a likelihood of occurrence of 10%, the random process operates such that there is a 10% chance that the certain possible outcome will be the result of the random process. The types of outcomes and their likelihood of occurrence are determined by reference to the outcome database 226.

To give some examples of rules that may be applied, one rule may hold that products costing more than $2.00 are not eligible to be awarded free of charge unless the total transaction price exceeds $50.00. Another rule that may be applied would hold that the likelihood of awarding a product free of charge is 1% for transaction totals of less than $10.00, 2% for transaction totals between $10.00 and $50.00, and 3% for transaction totals greater than $50.00. If the latter rule is applicable, and the transaction consists of five items and totals less than $10.00, the respective likelihood of each particular product being awarded free of charge may be the same for every product, i.e. 0.002. Alternatively, the likelihood of a particular product being awarded free may be inversely proportional to the price of the product, such that a product that costs half as much as another product would be twice as likely to be awarded free.

The likelihood of awarding a 50% discount on a given product may be adjusted according to similar rules.

Other rules may cause the likelihood of particular types of outcomes to be varied depending on factors such as the identity of the customer (e.g., whether the customer is a new customer or a preferred customer) or the availability of inventory to support awarding of a particular product. This information may be tracked, for example via an inventory database.

The random process may be constrained so that no more than one benefit, such as no more than one free product, may be awarded. Alternatively, more than one benefit may be awarded. There may be established a certain likelihood that all the products selected for the transaction may be awarded free of charge. There may also be another benefit having a certain likelihood of occurrence, such as a large cash prize or a free car. From the point of view of the merchant it may be desirable that any possible large prize have a small likelihood of occurrence so that the per transaction cost of the program is low. The likelihood that one of the more desirable benefits awarded may be adjusted depending on previous benefits that have been awarded to the customer. For example, it may be made less likely that the customer will be awarded a large prize or a free product if the customer has recently won a similar prize.

Once the type of outcome has been determined, it may then be necessary to select a particular outcome of the determined outcome. For example, if a free product is to be awarded, certain rules may be applied to select one of the products chosen for purchase by the customers. Instances of such rules have been mentioned above, and may include purely random selection of one of the products, or random selection with the likelihood of selection inversely proportional to the cost of the item. Similar approaches may be taken to selecting a product for a 50% discount, if that type of outcome is determined.

If the type of outcome is determined to be an award of an upsell or a coupon, rules may be applied to select a particular upsell or coupon to be awarded. Such rules may be stored in suitable databases, such as an upsell outcome database or a coupon upsell database.

The rules that may be prescribed by potential sponsors of such offers, and may depend on whether sponsors have paid to sponsor such offers. The relative likelihood that a particular upsell or coupon may be awarded may depend on the relative amounts that sponsors have paid. For example, if sponsor A has paid twice as large a sponsorship fee as sponsor B, then it may be twice as likely that sponsor A's coupons will be awarded as sponsor B's.

Whether an upsell offer is included as a possible outcome or not may depend upon availability of a product to be proposed as an additional item in the transaction pursuant to the upsell offer. In addition, or alternatively, the availability of an upsell offer as a possible outcome may depend on whether the products proposed to be added to the transaction are due to "expire" shortly. As will be appreciated by those who are skilled in the art, many products have limited shelf lives. Among these are many types of groceries, as well as periodicals such as magazines that are due to be replaced by new editions as of a given date. Inclusion of an upsell as a possible outcome may also depend on an amount of change that would be provided in connection with a transaction in the absence of an upsell. For example, if the transaction total results in $0.50 due, a product that costs $0.50 or a modest amount more than $0.50 may be offered as an upsell. Techniques for implementing so-called "spare change upsells" are disclosed in U.S. patent application Ser. No. 08/920,116 filed Aug. 26, 1997 and issued as U.S. Pat. No. 6,119,099 on Sep. 12, 2000 entitled METHOD AND SYSTEM FOR PROCESSING SUPPLEMENTARY PRODUCT SALES AT A POINT-OF-SALE TERMINAL.

Performance of steps 1110 and 1112 may also be contingent on various circumstances. For example, the game presentation and the random determination of a possible benefit may only be provided to customers who purchase more than a certain number of products. As another alternative, the game presentation and the random determination may only be provided for customers whose purchases total more than a certain amount of money. As still another alternative, the game presentation and the random determination of a benefit may only be provided for customers who purchase certain products or certain quantities of certain products.

Moreover, the provision of these features may be dependent on the time of day, day of the week, day of the month, etc. In one embodiment, steps 1110 and 1112 are only included in the process of FIG. 11 at times of the day when traffic is normally rather light in the store, so as to avoid delays at the POS terminal during times of peak usage of the store.

Still further, the steps 1110 and 1112 may only be provided to certain customers, such as those who have a history of spending a certain amount or visiting the store with a certain degree of frequency; i.e., these steps may only be provided for preferred customers. As still another possibility, these steps may be provided only for customers who have indicated in a customer profile that they wish to have these steps provided. It is also possible that steps 1110 and 1112 may only be provided to customers who have customer identification cards. Alternatively, steps 1110 and 1112 may be provided both to customers who have customer identification cards and to those who lack customer identification cards. In the latter case, step 1106 may be omitted.

It is also contemplated that customers may be charged money for the privilege of receiving steps 1110 and 1112. In such a case compliance with gambling regulations may be required. It may also be necessary to provide alternate forms of entry for the random processes disclosed herein.

As yet another alternative, only certain customers who purchase certain products may be provided with steps 1110 and 1112.

Figure 12:
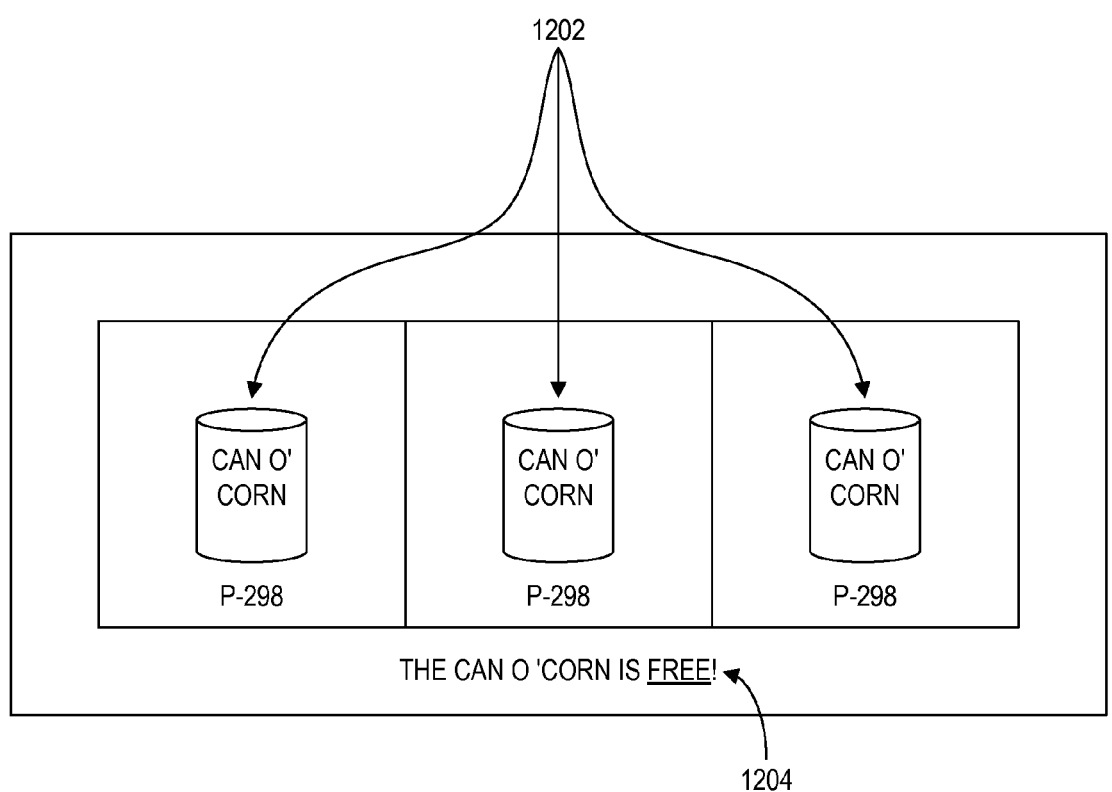
FIG. 12 shows a screen display which may be provided by the system of FIG. 1 in accordance with the invention.

At step 1114 the outcome determined at step 1112 is presented to the customer. For example, if it has been determined that one of the products selected for purchase by the customer is to be awarded free of charge to the customer, then a display like that shown in FIG. 12 may be presented to the customer at the display device associated with the POS terminal. It will be seen that in the display of FIG. 12 three images of a product ("Can o' Corn") are horizontally aligned to represent identical indicia on slot machine reels lining up to indicate a winning outcome. This is in accordance with the virtual slot machine interface referred to above. A similar display may be provided, with images of a coupon replacing the images of the product, if the random process results in a coupon being selected as a benefit to be awarded to the customer. Similarly, three symbols representing an upsell offer may replace the product images 1202 if it is determined that an upsell offer is to be provided to the customer. If the random process results in a 50% discount being awarded on a product, then one of the three product images shown in FIG. 12 may be replaced with a different symbol and the legend shown at 1204 may be replaced with the legend such as "50% off the Can o'Corn". If no benefit is to be awarded as a result of the random process, the display may show three different symbols horizontally aligned, to simulate a losing outcome on a slot machine. In the latter case, the display may include a legend such as "Sorry, no prize this time."

The spinning of the virtual reels may stop at a timing controlled by the system, or in response to the customer pressing a button. In the latter case, it is preferable that the timing at which the customer presses the button have no effect on the outcome determined by the system.

If a coupon is awarded as a result of the random process, the coupon may be printed out at the POS terminal via a coupon printer interfaced to the POS terminal. Alternatively, the coupon may be a virtual coupon that will be automatically redeemed if the customer purchases the product covered by the coupon during a subsequent visit to the store. Immediate redemption of the coupon or virtual coupon is also contemplated.

It is contemplated to employ game presentations other than a virtual slot machine reel in connection with the invention. Such other game presentations may include a virtual car race in which an image carried on the "winning car" indicates the outcome of the random process. For such a game presentation it is also contemplated to provide a user interface to the customer to enable the customer to control one of the cars in the car race. However, the result of the race may still be controlled by the central controller and/or the POS terminal such that the system operates a car or cars more successfully than the customer to control the outcome of the car race.

Another possible game presentation would be a basketball free throw competition in which animated characters compete to throw a basketball into a hoop. The characters may wear images that correspond to various possible outcomes, with the outcome determined by the random process being reflected by the image worn by the successful competitor among the animated characters.

An animated horseshoe competition is another possible game presentation.

In addition, other representations may be used, including animated characters who answer trivia questions, three virtual doors presented for selection by the customer, or a spinning wheel like a roulette wheel or a vertically-oriented wheel with prices around the circumference.

Other entertainment interfaces of the types described in the above-referenced patent application Ser. No. 09/538,773 may also be used.

The present invention also contemplates omitting the game presentation and presenting the outcome of a random process to the customer by means of text output. The text output may be displayed or may be printed out by, for example, a receipt printer.

At step 1116 the transaction is completed. Thus, for example, a transaction total is calculated, based on any benefit such as a free product or product discount that resulted from step 1112, or taking into account any upsell offer accepted by the customer. The customer pays for the transaction, by cash, check or credit card, and a suitable receipt is printed.

With the system of the present invention, retailers can make the shopping experience, and particularly time spent at the POS terminal, more entertaining and enjoyable for customers. As a result, an increased number of customers may be attracted to stores in which the present invention is applied.

In addition, because the game presentation and/or the presentation of results of a prize drawing tends to attract customers' attention to the display of the POS terminal, it may be desirable to inject advertising content into the display of the POS terminal, to generate advertising revenue for the proprietor of the store and/or the proprietor of the system. The system of the invention also may be a vehicle for presenting coupons and other promotions to customers. The advertising content may, but need not, be related to products that are promoted through the game presentation and the coupons or other promotional offers made available through the system of the invention.

According to other embodiments of the invention, it is contemplated to provide game presentations, and report results of random processes that may involve awarding a benefit to a customer, via terminals that are not POS terminals. For example, such terminals may be the shelf terminals 106 referred to in connection with FIG. 1 and located at store shelves on which products are presented for selection by customers. The terminals 106 may be similar to POS terminals, but may lack structure for receiving and storing currency and also may lack facilities for cashier entry of data, receipt printing or processing credit cards.

Alternatively, one or more of the shelf terminals 106 may be implemented as a portable computing device such as a personal digital assistant (PDA) carried by the customer and in wireless data communication with the central controller 102.

Figure 13:
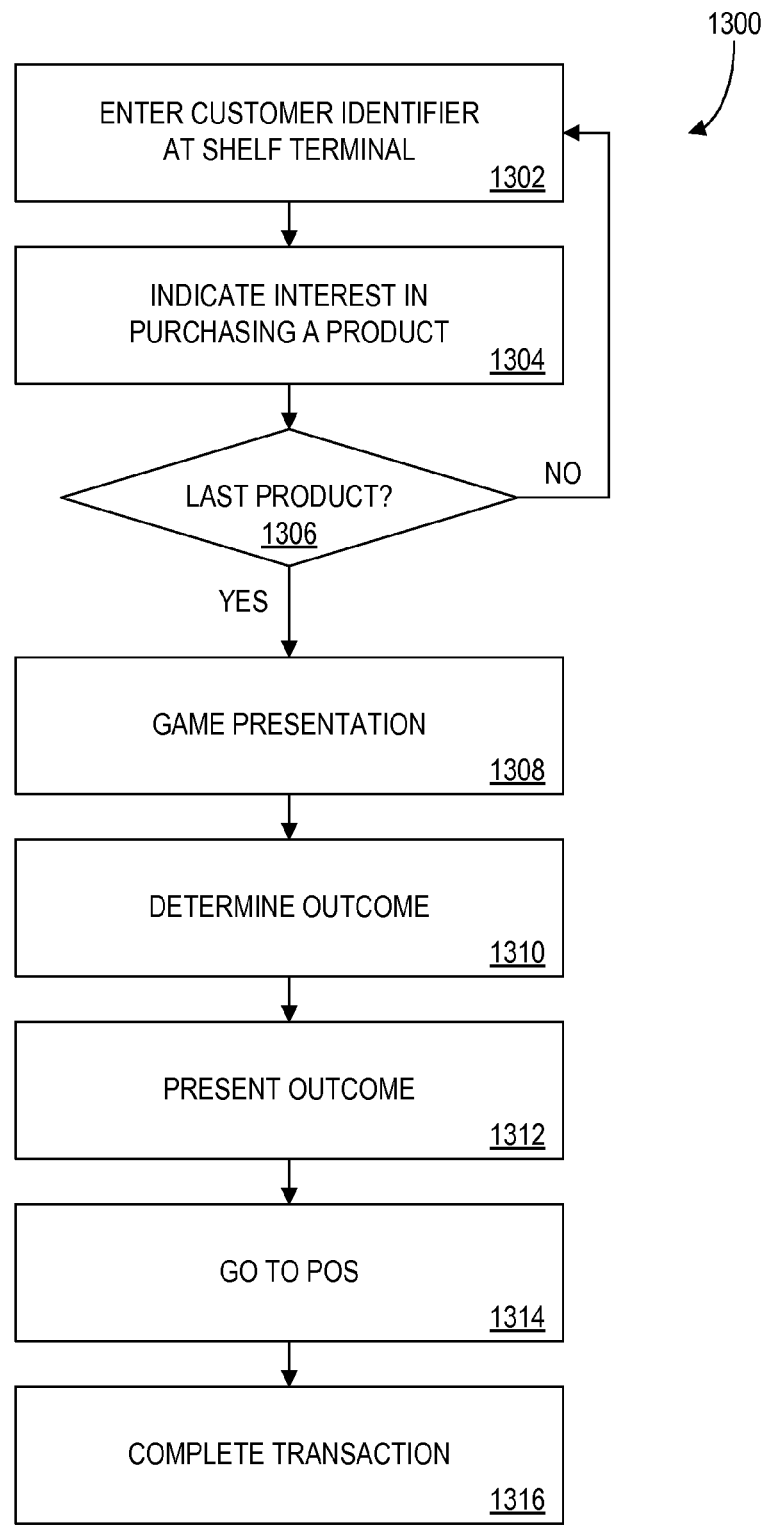
FIG. 13 is a flow chart that illustrates an embodiment of a process carried out in the system of FIG. 1 according to another aspect of the invention.

FIG. 13 shows a flow chart 1300 that illustrates a process carried out in accordance with the invention via shelf terminals 106.

At step 1302 in FIG. 13 the customer enters a customer identifying code at the shelf terminal and the code is received by the shelf terminal. As in step 1106, this may be done by swiping a shopper identification card having a magnetic stripe through a magnetic card reader, if such a reader is provided as part of the shelf terminal. Alternatively, the customer identifier may be entered through a conventional manual entry device such as a keypad or a touch screen.

At step 1304 the customer indicates an interest in purchasing a product. This may be done by using a bar code scanner, if available, to scan a bar code carried on a product that the customer wishes to select for purchase. Alternatively, a product identifying code may be entered via a touch screen or key pad. It is also contemplated that a touch screen at the shelf terminal may include icons or text strings that identify the products at the shelf and that may be actuated by the customer.

Decision block 1306 represents a determination as to whether the customer has indicated that he or she has completed his or her selection of products for purchase. If the customer has not so indicated, then he or she may enter additional product identifiers at the shelf terminal and/or he or she may proceed on to one or more other shelf terminals at which the customer's identifier and additional product identifiers may be entered.

Once the customer has indicated selection of the last product, steps 1308, 1310 and 1312 follow. These may be, for example, substantially the same as the steps 1110, 1112 and 1114 described in connection with FIG. 11. It is accordingly not necessary to describe steps 1308-1312 in detail. It should be noted that the game presentation step 1308 may be started prior to the customer completing the selection of products for purchase.

It is particularly advantageous to perform step 1312 at the shelf terminal 106 in connection with upsell offers, since in some situations it may be more convenient for the customer to find and collect a product offered pursuant to an upsell before the customer has proceeded to the POS terminal.

After steps 1308-1312, the customer proceeds to the POS terminal with the products that he or she has selected for purchase (step 1314). Then the transaction is completed (step 1316), which may occur in the same manner as was discussed in connection with step 1116 (FIG. 11). It will be understood that the results of steps 1308-1312 may have been communicated via the system to the POS terminal to aid in the checkout transaction at the POS terminal and to permit any award to be redeemed at the POS terminal. Results of steps 1308-1312 and any award may also be printed out at the shelf terminal and the resulting printed record presented at the POS terminal for processing and redemption of the award.

One advantage of the method of FIG. 13 is that the system may keep track of items that are usually purchased by the customer, and may provide a display to the customer to remind the customer of items that he or she customarily purchases but which have not been included in the process represented by the loop of steps 1302-1306. Alternatively, the system may simply analyze the set of products entered by the customer to recommend additional products that would be complementary to those that the customer has indicated an intention of purchasing.

Another advantage of the method of FIG. 13 is that the customer has entered product identifiers into the system prior to reaching the POS terminal, so that the transaction at the POS terminal itself may be expedited, thereby saving labor costs for the proprietor of the store.

Moreover, like the embodiment of FIG. 11, the embodiment of FIG. 13 helps to make the shopping experience entertaining for customers, thereby serving to attract customers to the store.

It has been noted above that game presentation may be omitted and the outcome of a random process may be presented to the customer by other means, such as by printed output. Thus the aspects of the present invention relating to awarding free of charge a product selected for purchase may be embodied without embodying the aspects of the invention related to displaying images of products. Furthermore, the aspects of the invention relating to awarding of free products may be omitted from an embodiment in which images of products are displayed. The product images may be displayed in a game presentation or otherwise.

In the examples provided above, random processes to determine whether a benefit is to be awarded are performed on a transaction-by-transaction basis, such that a plurality of products selected by the customer are eligible to be awarded free of charge. Alternatively, a random process to determine whether a benefit is to be awarded may be performed each time the customer selects a product for purchase. For example, a random process may be carried out on each occasion when a product code is entered into a POS terminal or a shelf terminal, and a game interface such as a virtual slot machine interface may be provided to indicate the outcome of the random process.

The exemplary embodiments described above indicate that the present invention may be applied in a supermarket. It is also contemplated to apply the present invention in other types of stores, including hardware stores and home centers, clothing stores, drug stores, department stores, fast food restaurants, bars and vending machines.

In one embodiment of the invention as applied to a fast food restaurant, a drive-through ordering terminal includes a display screen that displays images of products as they are ordered. Similarly, in a restaurant with sit-down service, images of items ordered may be displayed by using digital menus or via screens installed at tables.

According to an aspect of the invention, a method of handling a transaction at a point of sale (POS) terminal includes entering a plurality of product identifiers, each corresponding to a respective product selected for purchase by a customer, and generating a random outcome to determine if the customer wins one of the selected products, the random outcome also determining which one of the plurality of the selected products is won. A result of the generating step may be presented to the customer via an entertainment interface, such as a display screen depicting a slot machine.

According to another aspect of the invention, a method of handling a transaction at a POS terminal includes entering a product identifier that corresponds to a product selected for purchase, and, responsive to entry of the product identifier, displaying an image that represents the corresponding product.

According to still another aspect of the invention, a method of handling a transaction at a POS terminal includes entering into the POS terminal data for identifying a customer, and generating a random outcome to determine whether a benefit is provided to the customer, wherein the random outcome depends in part on a purchasing history of the customer. The benefit to be provided to the customer may be a coupon, an upsell offer, a free product or a discount offer.

According to yet another aspect of the invention, a method of handling a transaction at a POS terminal includes entering into the POS terminal data for identifying a customer, and generating a random outcome to determine whether a benefit is provided to the customer, where the random outcome depends in part on an outcome that was previously provided to the customer.

According to still a further aspect of the invention, a method of entertaining a customer at a shelf in a retail store includes entering into a terminal at the shelf a product identifier that corresponds to a product selected for purchase by the customer, and, responsive to entry of the product identifier, displaying to the customer an image that represents the corresponding product.

According to still another aspect of the invention, a method of entertaining a customer at a shelf in a retail store includes entering into a terminal at the shelf at least one product identifier that corresponds to a respective product selected for purchase, and generating a random outcome to determine whether the customer wins a product that corresponds to the at least one product identifier.

Although the present invention has been described with respect to preferred embodiments thereof, those skilled in the art will note that various substitutions, modifications and variations may be made with respect to the embodiments described herein without departing from the spirit and scope of the present invention.

What is claimed is:

1. A method comprising:
   receiving, via a point of sale terminal, a plurality of product identifiers, each corresponding to a respective product selected for purchase by a customer;
   generating, by a central controller device in communication with a plurality of point of sale terminals, a plurality of random outcomes;
   determining, by the central controller device, an upsell offer based on at least one of the random outcomes and based on at least one of the product identifiers; and
   presenting the upsell offer to the customer,
   in which presenting the upsell offer comprises:
   displaying an image representing the upsell offer as an indicia on a virtual slot machine reel.

2. The method of claim 1, wherein the product identifiers are received via a bar code scanner of the point of sale terminal.

3. The method of claim 1, further comprising presenting the random outcome to the customer.

4. The method of claim 1, further comprising displaying the random outcome to the customer.

5. The method of claim 4, in which displaying the random outcome comprises displaying the random outcome in an entertainment interface.

6. The method of claim 5, wherein the entertainment interface includes an image of at least one of the products corresponding to the received product identifiers.

7. The method of claim 1, further comprising:
   receiving a customer identifier for identifying the customer.

8. The method of claim 7, in which receiving the customer identifier comprises receiving the customer identifier via a card reader of the point of sale terminal.

9. The method of claim 1, further comprising:
   displaying an image that represents at least one of the products that correspond to the received product identifiers.

10. The method of claim 1, further comprising transmitting the random outcome to the point of sale terminal.

11. The method of claim 1, in which displaying comprises:
    displaying, via a shelf terminal, the image representing the upsell offer as an indicia on a virtual slot machine reel.

12. The method of claim 1, in which displaying comprises:
    displaying, via a portable computing device, the image representing the upsell offer as an indicia on a virtual slot machine reel.

13. The method of claim 1, in which displaying comprises:
    displaying at least three identical indicia of the upsell offer.

14. The method of claim 1, in which determining the upsell offer comprises:
    selecting the upsell offer from a plurality of upsell offers, each upsell offer having a respective sponsor.

15. The method of claim 1, in which determining the upsell offer further comprises:
    selecting the upsell offer from a plurality of upsell offers, each upsell offer having a respective likelihood of being awarded that is based on an amount paid by a corresponding sponsor of the upsell offer.

16. An apparatus comprising:
    a processor; and
    a storage device,
    in which the storage device stores a program which is operable to direct the processor to perform:
    receiving a plurality of product identifiers, each corresponding to a respective product selected for purchase by a customer;
    generating a plurality of random outcomes;
    determining an upsell offer based on at least one of the random outcomes and based on at least one of the product identifiers; and
    presenting the upsell offer to the customer,
    in which presenting the upsell offer comprises:
    displaying an image representing the upsell offer as an indicia on a virtual slot machine reel.

17. A non-transitory computer readable medium that stores a program which is operable to direct a processor to perform:
    receiving, via a point of sale terminal, a plurality of product identifiers, each corresponding to a respective product selected for purchase by a customer;
    generating, by a central controller device in communication with a plurality of point of sale terminals, a plurality of random outcomes;
    determining, by the central controller device, an upsell offer based on at least one of the random outcomes and based on at least one of the product identifiers; and
    presenting the upsell offer to the customer,
    in which presenting the upsell offer comprises:
    displaying an image representing the upsell offer as an indicia on a virtual slot machine reel.

* * * * *